United States Patent [19]
Phillips

[11] 3,988,838
[45] Nov. 2, 1976

[54] ARTISTS DEVICE

[75] Inventor: Robert C. Phillips, Southbury, Conn.

[73] Assignee: The Raymond Lee Organization, Inc., a part interest

[22] Filed: Sept. 15, 1975

[21] Appl. No.: 613,115

[52] U.S. Cl. .................... 33/274; 33/1 K
[51] Int. Cl.² .................... G01C 3/00
[58] Field of Search .................... 33/1 K, 262, 278, 279, 33/77, 274, 276, 277, 280

[56] References Cited

UNITED STATES PATENTS

| | | | |
|---|---|---|---|
| 1,145,050 | 7/1915 | Yates | 33/274 |
| 1,605,979 | 11/1926 | Pacioni | 33/274 |

*Primary Examiner*—William D. Martin, Jr.

[57] ABSTRACT

A device for enabling an artist to achieve correct proportions when drawing to a different scale than that of the object being reproduced. The device employs a flat transparent elongated plate having two parallel sides of unequal length, one straight and interconnecting these sides and being perpendicular to both sides, the opposite end being curved and interconnecting the two sides while being perpendicular to neither side. An elongated rectangular flat transparent arm lies in a plane parallel to the plate and adjacent to the plate and adjacent one major surface of the plate, one end of the arm being pivotally secured to the plate adjacent the straight end and longer side, the other end of the arm extending past the curved end of the plate. The curved end defines the arc of a circle centered at the point of pivot of the arm. Clamping means on the other end of the plate can be manually operated to clamp the arm to the curved edge of the plate in any desired position thereacross. A transparent slide adjacent the opposite major surface is supported on the sides of the plate, the slide being manually slidable back and forth longitudinally on the plate.

1 Claim, 3 Drawing Figures

ARTISTS DEVICE

SUMMARY OF THE INVENTION

The purpose of this invention is to assist the artist in preparing a scaled up or scaled down reproduction in correct proportion of an actual subject or drawing or the like. To this end, a device is constructed which is inexpensive, compact and quite precise.

The device employs three basic elements, a plate, an arm and a slide, all of transparent material such as plastic, and clamping means. The plate is flat and elongated with two parallel sides of unequal length, one straight end extending between the sides at right angles thereto, and an opposite end which is curved and interconnects the sides while being perpendicular to neither. The arm is elongated, lying in a plane parallel to that of the plate and adjacent one major surface of the plate. One end of the arm is pivotally secured to the plate adjacent the straight end and the longer side. The other end of the arm extends past the curved end of the plate. The curved end can define an arc of a circle centered on the pivot point of the arm. The slide is adjacent the opposite major surface of the plate and is supported on the sides of the plate. The slide is manually slidable back and forth longitudinally on the plate. The clamping means is disposed on the other end of the arm and is manually operable to clamp the arm to the curved edge of the plate in any desired position thereacross.

In use, the artist first decides the size of the picture to be drawn for example on canvas and also the distance he will stand from the subject, for example, an individual sitting for a portrait. He than locates to size a convenient feature of the picture, as for example, the head and locates two opposite points of this feature on the canvas. He than aligns the pivot point of the arm with one of these opposite points on the canvas and moves the slide until it is aligned with the opposite point. Then he holds the device at arm's length and looks at the same feature on the subject, turning the device so that an edge of the slide extends apparently between the two points of interest on the subject. He locates one of these points at the point of intersection of a sight line (drawn on the plate through the pivot point and parallel to a side of the plate) and the edge of the slide. He then pivots the arm until the point of intersection of arm and the same edge of the slide is coincident with the other point of interest and locks the arm in place.

The slide can then be moved to any other position while the intersection of the sight line and the edge of the slide defines one of the points of interest and the intersection of the arm and the edge of the slide defines the other point of interest, the length of the line between these points proportional to the actual separation between these points on the drawing. By this means, any proportional ratio or scale desired can be obtained.

If desired, a semicircular member having a peripheral curved semicircular edge and a straight edge can be integral and coplanar with the plate, the straight edge of the member being coincident with the straight end of the plate. A pointer equal in length to the radius of the circle defined by the member can be pivotally secured at one end to a point on the straight end defining the center of the circle. The other end of the pointer can be aligned with any point on the periphery of the member. This allows the artist by holding any convenient straight edge of the plate parallel to the apparent slope of a particular line or passing through two particular points on the subject, to measure the slope of same by reading the angle indicated by the pendulum pointer. Reproducing this slope at the easel by reference to the pointer and the same angular indication, the artist can then transfer the slope from the device to the canvas. The periphery of this member can be graduated in degrees. The pointer functions as a pendulum when the artist holds the device in a vertical plane.

DETAILED DESCRIPTION OF PREFERRED EMBODIMENTS

Figure 1:
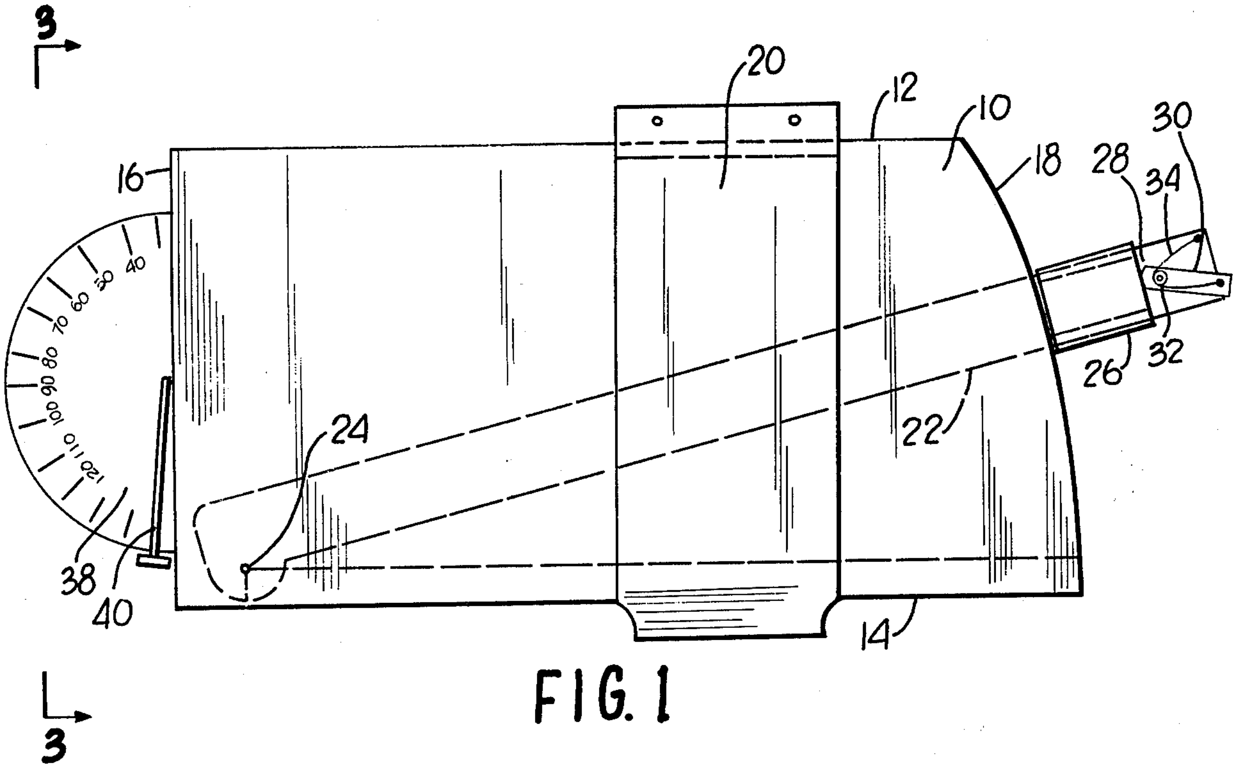
FIG. 1 is a front view of the invention.
Figure 2:
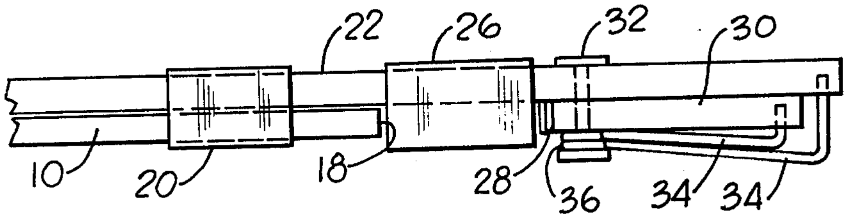
FIG. 2 is a top view of the invention.
Figure 3:
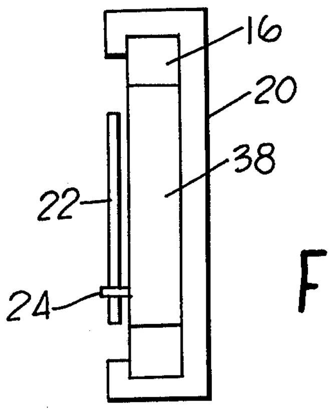
FIG. 3 is an end view of the invention taken along line 3—3 in FIG. 1.

Referring now to FIGS. 1–3, a plate 10 which is flat and elongated has parallel sides 12 and 14, side 14 being longer than side 12, one straight end 16 perpendicular to and extending between sides 12 and 14, and one opposite curved end 18 extending between the sides and being perpendicular to neither. A slide 20 is adjacent one major surface of the plate and has inwardly turned ends engaging the sides of the plate whereby the slide can be moved longitudinally back and forth along the plate. An elongated arm 22 is disposed adjacent the other major surface of the plate and lies in a plane parallel thereto. One end of arm 22 is secured by pivot pin 24 to the plate at a point adjacent end 16 and side 14. The other end of the slide extends past the curved end of the plate. This curved end defines an arc of a circle centered on pin 24.

A second slide 26 is disposed on arm 22 adjacent the curved end 18 and the adjacent end of the arm. The slide is adjacent a curved end 28 (defining a cam surface) of linkage 30. The slide can have a high friction surface where it engages the curved edge of the plate. The linkage adjacent this curved end is pivotally secured to the arm by pin 32. The opposite end of the linkage extends beyond the other end of the arm. A U-shaped spring 34 has one end engaging the opposite end of the linkage, an opposite engaging arm 22 adjacent an exposed corner of its opposite end, and a central loop 36 engaging the pin 32. The linkage can be swung until its cam surface forces slide 26 into contact with both linkage and curved end 18 to lock the arm in place. The linkage can also be swung to unlock the arm. The clamping device is spring loaded to the locked condition. Linkage 30 is so located that its edge swings past the edge of arm 22 when released. Then merely grasping arm 22 and linkage 30 unlocks arm 22 while releasing these parts locks arm 22.

A semicircular flat member 38 has an edge calibrated in degrees and can be coplanar and integral with plate 10 with the straight edge of the member coincident with end 16. A pointer 40 equal in length to the radius of the circle defined by member 38 can be pivotally secured to the integral structure at a point along end 16 representing the center of this circle. Pointer 40 is a pendulum, free to move in a plane parallel to that of 38. The other end of the pointer can be aligned with any point on the curved periphery of the member 38. The other end of the pointer can carry a slidable element which can be moved into engagement with the periphery of member 28 to lock the pointer detachably in any position desired.

The member 38 and pointer 40 can be eliminated if not desired.

Although the invention has been described with particular reference to the drawings, the protection sought is to be limited only by the terms of the claims which follow.

What is claimed is:

1. A device comprising:

a flat transparent elongated plate having two parallel sides of unequal length, one straight end interconnecting the sides and being perpendicular thereto, the opposite end being curved and interconnecting the two sides while being perpendicular to neither side;

an elongated flat transparent arm lying in a plane parallel to the plate and adjacent one major surface of the plate, one end of the arm being pivotally secured to the plate adjacent the straight end and longer side, the other end of the arm extending past the curved end of the plate, the curved end of the plate defining an arc of a circle centered on the pivot point of said arm;

clamping means on the other end of the arm manually operable to clamp the arm to the curved edge of the plate in any desired position thereacross, said clamping means including a small elongated linkage pivotally secured at a point intermediate its ends to the arm adjacent the other end of the arm, spring means engaging the other end of the arm, one end of the arm, one end of the linkage and said pivot point, the other end of the linkage being disposed between said one end of the linkage and the curved end of the plate and a slide longitudinally slidable on the arm between the curved end of the plate and the other end of the linkage, the clamping means being engaged when said other end of the linkage bears against the slide and the slide engages the curved end of the plate, the clamping means being disengaged when said slide is spaced from the curved end of the plate;

a semicircular member of like thickness as said plate, said member and plate being coplanar and integral, the straight side of the member being coincident with the straight end of the plate;

a pointer extending along one of the major surfaces of the plate with one end of the pointer alignable with any point along the curved periphery of the member, the other end of the pointer being pivotally secured to said straight end of the plate, said pointer defining a radius of the circle defined by the semicircular member; and another and transparent slide adjacent the opposite major surface of the plate and supported on the sides of the plate, said another stride being manually slidable back and forth longitudinally on the plate.

* * * * *